No. 734,797. Patented July 28, 1903.

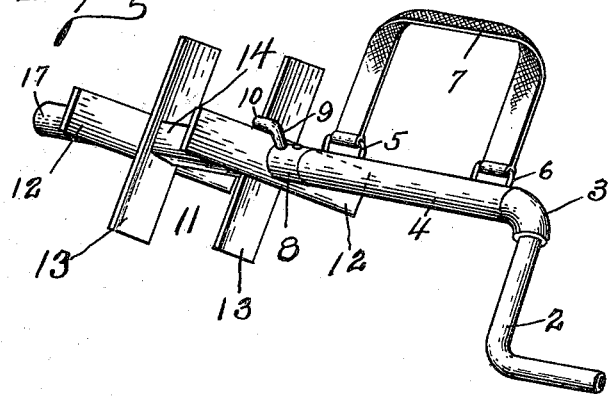
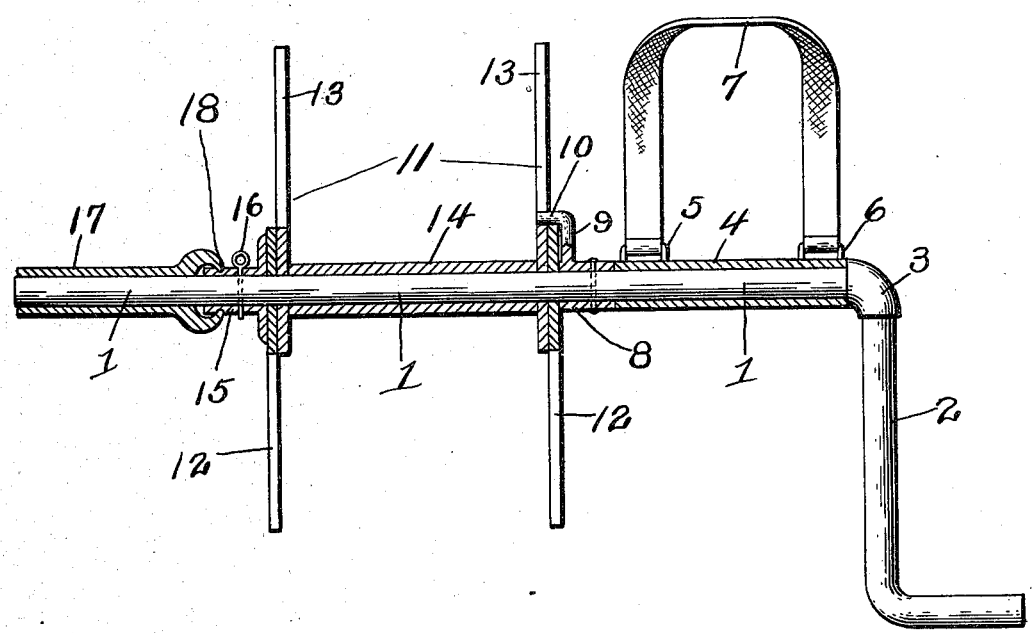

UNITED STATES PATENT OFFICE.

PAUL VAN ALLEN AUSTIN, OF ATTICA, NEW YORK.

WIRE-WINDING MACHINE.

SPECIFICATION forming part of Letters Patent No. 734,797, dated July 28, 1903.

Application filed March 26, 1903. Serial No. 149,754. (No model.)

*To all whom it may concern:*

Be it known that I, PAUL VAN ALLEN AUSTIN, a citizen of the United States, residing at Attica, in the county of Wyoming and State of New York, have invented certain new and useful Improvements in Wire-Winding Machines; and I do hereby declare the following to be a full, clear, and exact description of the invention, such as will enable others skilled in the art to which it appertains to make and use the same.

My invention relates to reels of that class designed to be used for winding up and releasing wire, and more especially that class of wire known as "barbed" wire.

My object is to provide a means whereby when it is desired to remove a line of fence constructed of strands of wire it may be accomplished easily and expeditiously and at the same time keep the strands in a neat compact roll ready to be again used, if desired.

Others objects and advantages will be hereinafter more fully stated.

In the accompanying drawings, Figure 1 is a perspective view of my device complete, and Fig. 2 is a central longitudinal section thereof.

In the drawings similar reference characters designate corresponding parts in both views, referring to which—

1 indicates a shaft, said shaft having one of its ends bent downwardly and outwardly to form a hand-crank 2. This shaft is preferably constructed of hollow tubing, such as gas-pipe or the like, although it may be of solid material or wood; but by constructing it of gas-pipe it enables me to produce a very strong and durable device and at the same time materially reducing its weight. The cranked portion 2 and the shaft proper are joined together by means of an elbow 3. A sleeve 4 is slipped on the shaft 1, one end of which rests against the face of the elbow 3. The shaft 1 is designed to freely turn in said sleeve. Secured to the sleeve 4 near each end are loops 5 and 6, into which are secured the ends of a strap 7, said strap being designed to take around the neck of the operator and by which means that end of the shaft is supported, thus leaving the hands of the operator free to turn the crank 2 when so desired.

Rigidly secured to the shaft 1, immediately adjacent to the tube 4, is a collar 8, said collar having an arm 9 formed integrally therewith, the upper end 10 thereof being bent at right angles to the body portion of the arm 9.

Immediately adjacent to the collar 8 is a reel or spool 11, said reel being the usual and well-known device such as is commonly used to wind barbed or other class of wire upon. The usual mode of constructing said spools is to secure the parts 12 and 13 together in such a manner as to form X-like ends and secure said end sections to the body portion 14, said body portion being provided with a central bore, through which takes the shaft 1. In order to force the reel to revolve with the shaft, the reel is shoved onto the shaft until the portion 10 of the arm 9 rests between the forked ends of the sections 12 and 13, as shown more clearly in Fig. 1, and as the collar 8, carrying the arm 9, is rigidly secured to the shaft 1 the reel is forced to travel with said shaft. The reel is held in place upon the shaft 1 by means of the collar 15, said collar being in turn held in place upon the shaft by a bolt 16, passing through orifices in said collar and shaft. The shaft 1 extends beyond the collar 15 far enough to give an assistant operator a sufficient handhold to support his end of the shaft 1. As the shaft 1 revolves it becomes necessary to provide a sheath 17, so that the assistant operator may retain his hold upon said sheath and permit the shaft to turn therein. The sheath is held in place upon the shaft by having its inner end enlarged to take over the end of the collar 15, the innermost edge of said enlarged portion being bent downwardly to take into an annular groove 18, surrounding the collar 15.

When it is desired to remove the reel from the shaft 1, the bolt 16 is removed and the collar 15 and sheath 17 then removed from the shaft, when the reel may be easily removed.

Heretofore it has been an arduous and dangerous task to handle barbed wire after it has been built into a fence, owing to the absence of a device of this kind, and cost more to utilize the old wire in constructing a new fence than it did to buy new wire, thereby losing the use of the old wire entirely and making the cost double what it should be. With the employment of my device two men can operate the same and reel up the wire as fast as they can move forward, the man having the strap around his neck operating the crank 2 to turn the shaft and reel and the assistant supporting the opposite end of the shaft and by moving that end of the shaft slightly in one direction or the other cause the wire to wind evenly upon the spool. The device may also be used advantageously in distributing the wire ready to be built into a fence.

It will now be seen that I have produced a light, durable, and inexpensive device, and one that can be stored in a very small space, and while I have shown the preferred form of construction it will be understood that I desire to comprehend in this application all substantial equivalents and substitutes.

What I claim as new, and desire to secure by Letters Patent, is—

In a wire-winding device the combination with a shaft having a crank at one end, of a sleeve having loops, a strap adapted to engage said loops, a collar 8 rigidly secured to said shaft, said collar having an arm 9, a reel adapted to be operated by said arm, a collar 15 removably secured to said shaft and a sheath revolubly secured to said collar substantially as set forth.

In testimony whereof I affix my signature in presence of two witnesses.

PAUL VAN ALLEN AUSTIN.

Witnesses:
GEO. T. LOOMIS,
C. E. LOOMIS.